United States Patent [19]
Della Torre

[11] Patent Number: 5,197,317
[45] Date of Patent: Mar. 30, 1993

[54] PROCESS AND MEANS FOR AUTOMATICALLY MATCHING AT LEAST TWO SUBSTANTIALLY CYLINDRICAL SURFACES, ENGAGING EACH OTHER, PARTICULARLY FOR MECHANICAL EMBOSS ENGRAVING, AND ENGRAVED PLATES OBTAINED WITH SUCH PROCESS AND MEANS

[76] Inventor: Renato Della Torre, Via Di Vittorio 9, I-21057 Olgiate Olona, Varese, Italy

[21] Appl. No.: 572,995
[22] PCT Filed: Dec. 13, 1988
[86] PCT No.: PCT/EP88/01150
  § 371 Date: Aug. 13, 1990
  § 102(e) Date: Aug. 13, 1990
[87] PCT Pub. No.: WO90/06856
  PCT Pub. Date: Jun. 28, 1990

[51] Int. Cl.$^5$ .............................................. B21H 7/14
[52] U.S. Cl. ........................................ 72/102; 72/703
[58] Field of Search ........................... 72/81, 703, 102; 318/571; 101/6, 7, 22, 23

[56] References Cited

U.S. PATENT DOCUMENTS

| | | | |
|---|---|---|---|
| 3,292,403 | 12/1966 | Lewis | 72/81 |
| 3,537,287 | 11/1970 | Schwartz et al. | 72/81 |
| 3,987,350 | 10/1976 | Pomella et al. | 318/571 |
| 4,178,537 | 12/1979 | Angst | 318/571 |
| 4,178,846 | 12/1979 | Giovanelli | 72/703 |

Primary Examiner—Lowell A. Larson
Attorney, Agent, or Firm—Gifford, Groh, Sprinkle, Patmore and Anderson

[57] ABSTRACT

A process and machine for automatically matching at least two substantially cylindrical surfaces for engaging each other, particularly for the purpose of mechanical embossment engraving. The ranges of freedom of a conventional machine are mechanized and subjected to an electronic control, providing a hardware structure driven by software. The software controls the starting, repetitive and final steps, automatically complying with spacing and timing. The operator's action is needed only for loading of the roll to be worked, setting the inherent knurling tool, setting the starting positioning, and starting the cycle, as well as, for removing the unfinished roll for the corrosion steps and of course for final unloading.

12 Claims, 5 Drawing Sheets

PROCESS AND MEANS FOR AUTOMATICALLY MATCHING AT LEAST TWO SUBSTANTIALLY CYLINDRICAL SURFACES, ENGAGING EACH OTHER, PARTICULARLY FOR MECHANICAL EMBOSS ENGRAVING, AND ENGRAVED PLATES OBTAINED WITH SUCH PROCESS AND MEANS

BACKGROUND OF THE INVENTION

1. Field of the Invention

The present invention relates to a process and apparatus for automatically matching and engaging two substantially cylindrical surfaces. At least one of the cylindrical surfaces is a knurling tool for mechanical emboss engraving, particularly of rolls. The embossed rolls are used for embossing sheet materials and the like. Furthermore the present invention relates also to the mechanical engraved plates obtained with such process and means Chemical corrosion can be used to complete the engraving process.

2. Prior Art

At the present state of the art, processes and means for matching two surfaces to engage each other, particularly for mechanical emboss engraving, are both time consuming and repetitive. Most often these processes and means are manual due to the difficulties encountered in automating them. These processes and means, being difficult to obtain, are provided only on relatively expensive machines operated by highly skilled and specialized operators. The process uses a long machine cycle and requires the operator's constant presence and checking. The engraved products obtained with such process and means are very expensive and have poor precision because of inconsistency of the operator's ability and skill. Operation of the manual machine was limited to regular work time because night shifts or expensive overtime was not desirable. Recourse to overtime work was inevitable when preparation time was so extensive that delivery time was also extended. More than one machine could not be used to make the same piece. The stressful character of performing this work, combined with the responsibility connected therewith was very high because an almost finished roll could be damaged by a small lack of attention, and it was usually not possible to remedy the defect in time. A real and present danger was the need for the operators to put their hands in very risky places.

In particular, an operator has the task to move the active surface of a knurling embossing tool, under pressure to mate with a generally cylindrical passive surface to be mechanically engraved or embossed. Generally the size ratio, between one or more tools and the roll to be engraved is from 2 to 10 with reference to diameter and from 10 to 1000 referring to the whole roll length. Thus, in the course of longitudinal working the roll, the knurling tool must be displaced at least longitudinally, a corresponding number of times. Each time the knurling tool is moved it must be checked against the correct matching reference to suitable markers. However, when the longitudinal repetition pitch of the design exceeds 4-5 cm, a substantially double knurling tool length is needed. When the necessary pressure for an embossing process substantially exceeds the power of the machine, the barrel-like shape of the knurling tool is increased. The same knurling tool is used by fractionally varying the axes of inclination of same knurling tool 4-5 cm each time. For this reason the machine is provided with a third range of freedom, a Z axis, in order that this parameter may be adjusted. If the repetitivity of the design to be embossed has a worm trend, an angular excursion of the knurling tool with respect to the roll to be worked was made manually. The knurling tool was moved along its longitudinal axis. Thus, the operations to be made manually, in each working step, are from a minimum of two to a maximum of four. This requirement was a further obstacle to automation since, each design requires a different working cycle, which must be precisely complied with for a good product.

SUMMARY OF THE INVENTION

The invention, as claimed, is intended to remedy these drawbacks. The inventor has conceived a process and means for automatically matching at least two engagement surfaces, that of knurling tool and that of roll to be engraved. This invention is particularly useful for mechanical emboss engraving, whereby the ranges of freedom of the manually operable tool machine are mechanized and subjected to electronic control. A hardware structure is provided to be automatically driven by the software. The software can read the design to be engraved, and control the starting, repetitive and final steps, complying with locations and times. The operator's action is needed only for loading both the roll to be worked and the knurling tool, for setting the positioning and starting the cycle, and then for removal of the unfinished roll for the corrosion steps and for the final unloading.

In particular, the machine substantially has a conventional structure, such as of a lathe-like machine, wherein the tool comprises a knurling tool. The machine has four ranges of freedom including that of substantially radial, which, is subjected to a press for radial approaching. In accordance with the present invention, the roll to be worked is moved by the action of a D.C. motor. The motor is controlled by an encoder. The signals of the encoder may be referred to as correct present settings of roll to be worked, even relatively to position, at least longitudinal, of the knurling tool.

The four ranges of freedom, as well as the fastening condition, which occurs without turning of the knurling tool, are characterized as follows. Longitudinal movement of the carriage, whereon the knurling tool carrier device is installed, is achieved by a conventional screw and/or bar of the machine tool. The conventional screw and/or bar are rotated by a separate d.c. motor and the position of the carriage with respect to the roll is controlled by an encoder. Limit switches may be installed at the ends of the roll to be worked.

The second range of freedom comprises a substantially radial, and a substantially vertical, movement of approaching and removal of the knurling tool to and from the roll to be worked. Such range of freedom includes a base place to be determined once manually. The base place is set by adjusting a screw, to determine the position chiefly centripetal to the angular excursion which is provided by a first class lever suspension. The power is provided by a pneumatic or hydraulic cylinder-piston unit, subjected to a hydraulic station, and is adapted to be driven by an electrovalve, and controlled by signals coming from a computerized electronic system. This second range of freedom is limited by a limit switch.

The third range of freedom comprises rotation of the knurling tool around its axis. The knurling tool which is substantially idle, is induced by the roll to be worked, when the knurling tool engages it. The knurling tool although rotated on its Y axis when encountering the roll to be worked can be braked as needed by a brake device or a fastening device in the time period between detaching and reapproaching.

The fourth range of freedom is comprised by angular movement of the knurling tool about a fixed fulcrum. Rolling of generatrixs of tangency may take place by a driver including a second class lever. The driver is powered by a screw loading a spring and has as resistance a substantially bridge-like support, carrying the knurling tool. Vertical positioning of the knurling tool is provided by extending a piston within a fluidynamic cylinder, thereby providing operating pressure. This range of freedom is used only when the pitch or ratio, of the design to be engraved, is greater than 4-5 cm, and the corresponding length of the knurling tool is greater than 8 cm, with a barrel-like shape. Possible use of this fourth range of freedom is needed during movements regarding the third range of freedom.

Control of these four ranges of freedom conventionally was made manually, at least on driving and/or starting and/or adjusting and/or stopping. The present invention solves these a specific problems. In particular, regarding the first movement: the lead screw is driven by a permanent magnet motor which is powered by a d.c. cable. A telereverser, not shown, acts on the magnet and is placed within the electric panel. The lead screw is coupled in axial relationship with an encoder whose input and output terminals are connected to an electric and electronic panel, to be described. The range of movement of the carriage is limited by two limit switches. The limit switches are electrically connected, by wires, to the electric panel.

Referring now to the second movement, instead of a manual driver device, which was removed, an alternative, fluidynamic motor is used. The fluidynamic motor is fed by a hydraulic station. The electrovalve system and circuit associated thereto and controlling such movement have duplicate members and controls. The duplicate members and controls allow two different intensities of presssure. The pressure is adjustable and is lower at the beginning and for a certain time, set by a timer. Then a full pressure is used. The full pressure is adjustable too, set once and holds the pressure for a period of time.

The hydraulic station also drives another device, to be described hereafter, substantially with reference to third movement.

The third movement includes an asynchronous three-phase motor with a permanent magnet d.c. motor. The same motor is the indirect drive of a roll gripping chuck. Such driving is provided through a belt transmission and gears. The encoder, associated with this movement for monitoring the real movement of the roll to be worked, is engaged by the cylindrical surface of the leading disc. The leading disc includes a dog-like driving means which has substantially zero clearance, both with respect to the hub of the roll to be worked and thus with the roll, as well as with respect to the leading disc.

This third movement is of decisive importance, since it provides rotation of the knurling tool. The knurling tool pivots are idly mounted on its supports, in a conventional manner. The unbraked knurling tool is induced to rotate by the rotation of the roll.

As soon as a complementary relief is formed on the roll, a proper meshing is established with the knurling tool. The proper meshing eliminates the need for a reference mark on drivers and transmission members upstream of the encoder and engaged by the driver disc and on the disc itself.

To re-establish meshing between the knurling tool and the roll 4, after each longitudinal movement of the knurling tool, 1) when the two members providing the coupling, have to reencounter each other in the same reciprocal angular position as when linear repetitivity is required, both in case that the reencounter happens to be at reciprocal different angular positions, dictated by longitudinal pitch P and by angular pitch p of the drawing, or 2) when the position that the knurling tool is providing (design with worm or angular repetitivity).

In the first case a substantial absence of movement of the roll to be worked, corresponds with the absolute immobility of knurling tool. According to a preferred embodiment of the present invention, the end pivots of the knurling tool, are longer than conventional ones. The end pivots extend outward from the supports and are engaged by a pair of brake shoes. The brake shoes are driven by alternative fluidynamic motors controlled by electrovalves and fed by the same hydraulic station which provides pressure for the second movement. In the second case, the absolute immobility of the knurling tool is obtained in the same manner. The knurling tool is made to correspond with an angular movement which is controlled by an encoder, while, during engaging and disengaging there is a small gap of idleness, of the roll. An almost spontaneous small adjusting of the angular position favors engaging and disengaging of the projections. Following an arcuated stroke, the knurling tool goes freely to and from the tangency or engagement condition.

Because semiautomatic operation of the system occurs in an operator's absence, an automatic lubricating system is needed. The system can operate up to 120 hours unattended and the automatic lubricating system lubricates the pivots of the knurling tool. Different lubricating methods are used. Lubrication is accomplished by soaking or by timed forced injection.

Referring now to the fourth movement, it includes a screw driving a kinematic device. The kinematic device comprises a mechanized reaction spring which provides the screw with a member which is driven by a complementary member. A permanent magnet D.C. motor with power supplied through a wire drives the complementary member. An encoder powered by a corresponding cable is axially coupled to the screw. A pair of angular limit switches, connected with cables, are also placed on the screw and wherein the screw pitch is such to maintain the excursion within an angle less than 360°.

BRIEF DESCRIPTION OF THE DRAWINGS

In order to explain the features of the present invention, reference is made to the accompanying drawings which show one possible embodiment thereof in schematic manner and merely by way of explanation.

FIG. 4 shows both the barrel-like shape which, in practice, is included in a range between z1 and z4, and 0,6 mm, of radius difference and rolling, as well as longitudinal and angular feeding.

DETAILED DESCRIPTION OF THE INVENTION

Figure 1:
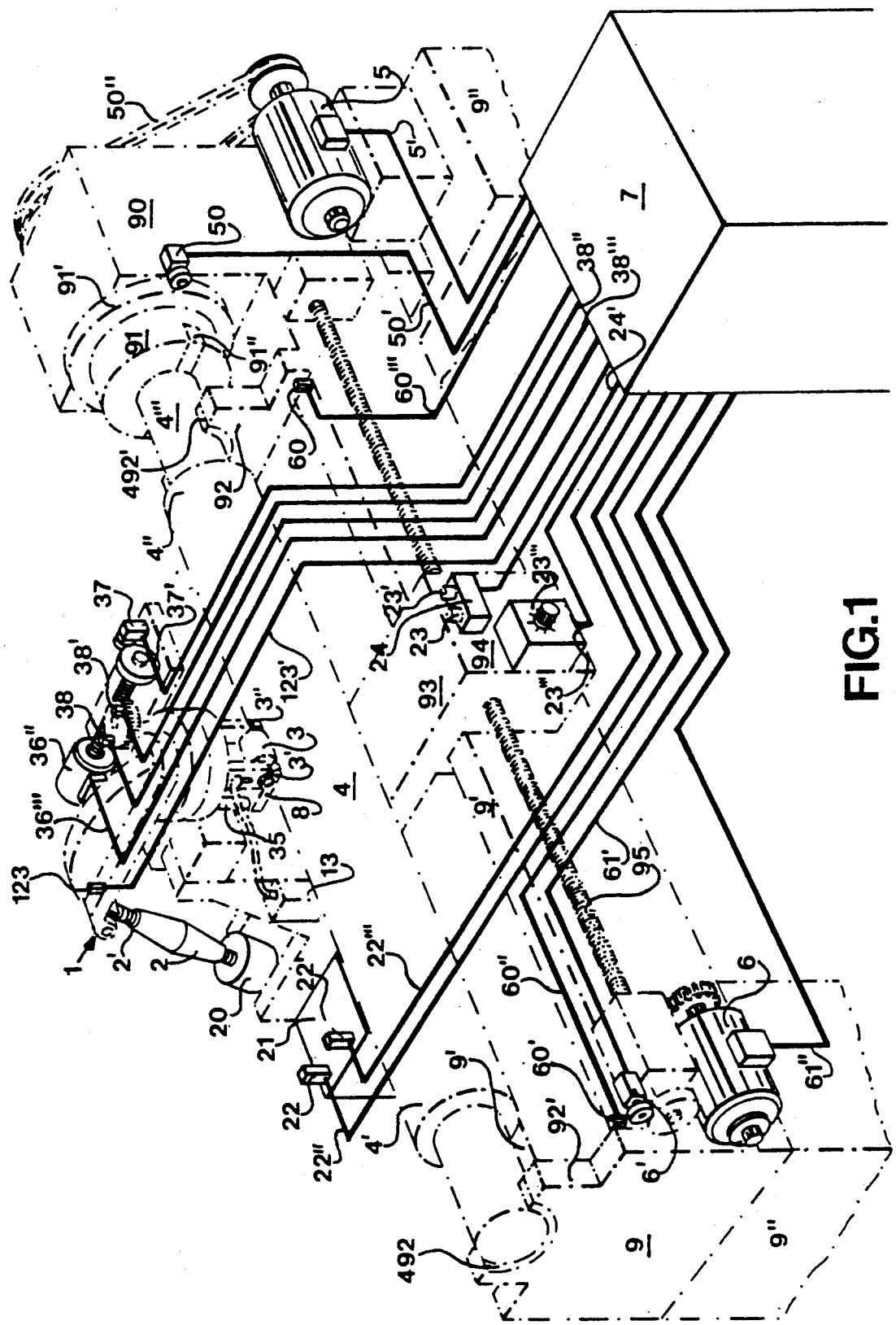
FIG. 1 is a schematic perspective view of a machine, in accordance with the present invention, wherein the substantially conventional parts, are shown in phantom lines. The parts, according to the present invention, are shown in solid lines and in a relatively simplified and/or symbolic fashion. The input and output signals and power circuit are all connected with an electric and electronic panel contained in a separate shelf body.

Referring now to the figures of the drawings, a machine for mechanical engraving of rolls includes, conventionally, a lathe-like structure, including a frame 9. The frame 9 has guides 9', two boxes 9", a head 90 having a gripping chuck 91, the gripping chuck 91 is driven by a motor 5, a pair of steady rests or supports 92, 92' a carriage 93 having an apron 94 mounted to the steady rests 92 and 92' and a screw 95 comprises the operative engraving unit. The operative engraving unit also includes a knurling tool 3 having four ranges of freedom, including a substantially radial movement for approaching, which is caused by the action of a press 2.

According to the present invention, a D.C. motor drives the gripping chuck or faceplate 91 to which the roll 4, to be worked is attached. The roll 4 turns around its axis. The d.c. motor 5 receives electrical power by means of cable 5' from the electric panel 7 and is controlled by an encoder 50. Signals from the encoder 50 are received through one or more wires 50' and these signals may be referred as present correct positions of the roll 4 being worked. The present correct positions are also used to position, at least longitudinal the position of knurling tool 3.

The four conventional ranges of freedom and, in accordance with the present invention, the braking or unbraking of the knurling is characterized as follows. Longitudinal movement of the carriage 93, on which the knurling tool unit 1 is mounted, is driven by a conventional screw 95 of a machine tool. However, knurling tool unit 1 is disassociated from the rest of the tool machine and driven by motor 6, receiving electrical power by means d.c. cable 61", and its position is determined by an encoder 6'. The signals generated by the encoder 6', referred to as correct present postion, of knurling tool 3 with respect to roll 4 are transmitted through one or more wires 61'. Limit switches 60, 60' connected to the electric panel through cables 60", 60'" may be placed at the ends 4', 4" of roll 4 to be worked.

The second range of freedom, of knurling tool 3, comprises a substantially radial and substantially vertical movement, for approaching and displacing it away from the roll 4 being worked. Such range of freedom includes a base position, to be determined manually, only once. The base position is set by adjusting a screw 2' of press 2, to determine the utmost centripetal position, of angular extension. The press 2 is driven by a first class lever suspension, as is known which is powered by a fluidynamic or hydraulic cylinder-piston unit 20 according to the present invention. A fluidynamic or hydraulic cylinder-piston unit 20 is connected to a hydraulic station 21, and is controlled through a pair of electrovalves 22, 22'. The pair of electrovalves 22, 22' are in turn controlled by input signals coming through wires 22", 22'" from the electronic computerized circuit 7. Even this range of freedom is limited by a limit switch 123, connected to the electronic computerized circuit 7 by wire 123'.

The third range of freedom includes rotation of the knurling tool 3 on its projecting hubs 3', 3" about its axis. The knurling tool 3 is substantially idle and rotation is induced by the roll 4. (This is named the Y axis.) The knurling tool 3 engages the roll 4 and therefore they will rotate at the same time. A temporary braking or fastening device 8 is operated to cover the time gap between removal and re-engagement of the knurling tool 3. These brakings allow compliance with the second range of freedom, which are consequent to each positioning, according to the first range of freedom.

The fourth range of freedom is comprised by angular excursion (about the Z axis) of axis defined by the hubs 3', 3" of knurling tool, about a fixed fulcrum 30. Generatrixs (03) Z1, Z2, Z3, Z4, of tangency, may take place by driving a system, as is known. The system includes a second class lever, which has, as power, a screw 30' loading a spring 30" and as resistance a substantially bridge-like support 31, carrying knurling tool 3. Vertical positioning, of knurling tool 3 is provided by extension of piston 20', within the fluidynamic cylinder 20 which provides the operating pressure. This range of freedom, is used only when the pitch or ratio, of the design to be engraved, is greater than 4-5 cm, with a corresponding length of knurling tool 3 greater than 8 cm, and having a barrel-like shape 03. This range of freedom may possibly be needed during movements regarding the third range of freedom. Conventionally these ranges of freedom, were controlled manually, at least for driving and/or starting and/or adjusting and/or stopping. According lo the present invention, suitable means are provided, already described in part, to solve the specific problems.

In particular, regarding the first movement: the lead screw 95 is driven by a permanent magnet motor 6. The permanent magnet motor 6 is powered by a D.C. cable 61". The permanent magnet motor 6 is subjected to a tele-reverser, not shown, placed within electric panel 7. The lead screw 95 is coupled in an axial relationship with an encoder 6' whose input and output terminal 1', is connected to the electric and electronic panel 7. The excursion range of carriage 93 is limited by two limit switches 60, 60', also electrically connected, by wires 60" and 60"', to the electric panel 7.

Referring now to second movement, instead of a manual device driver, not shown, which has been removed, an alternative fluidynamic motor 20, fed by a hydraulic station 21 is used. A pair of electrovalves 22, 22" have electrical wires 22", 22"', connected thereto for controlling the second movement. A duplicate of members, not shown, includes drivers 23, 23', controlled by electrovalve 24, connected by wire 24' to the electric panel 7 whereby the approaching pressure applied to fluidynamic motor 20 is provided with two different intensities: adjustably lower at the beginning and upon a certain time set on a timer 23" connected to the electric panel 7 by wire 23''', a full pressure, which is adjustable too, once and for a certain time. On the other hand, the hydraulic station 21 drives also another device, to be described hereafter, substantially with reference to the third movement.

Figure 4:
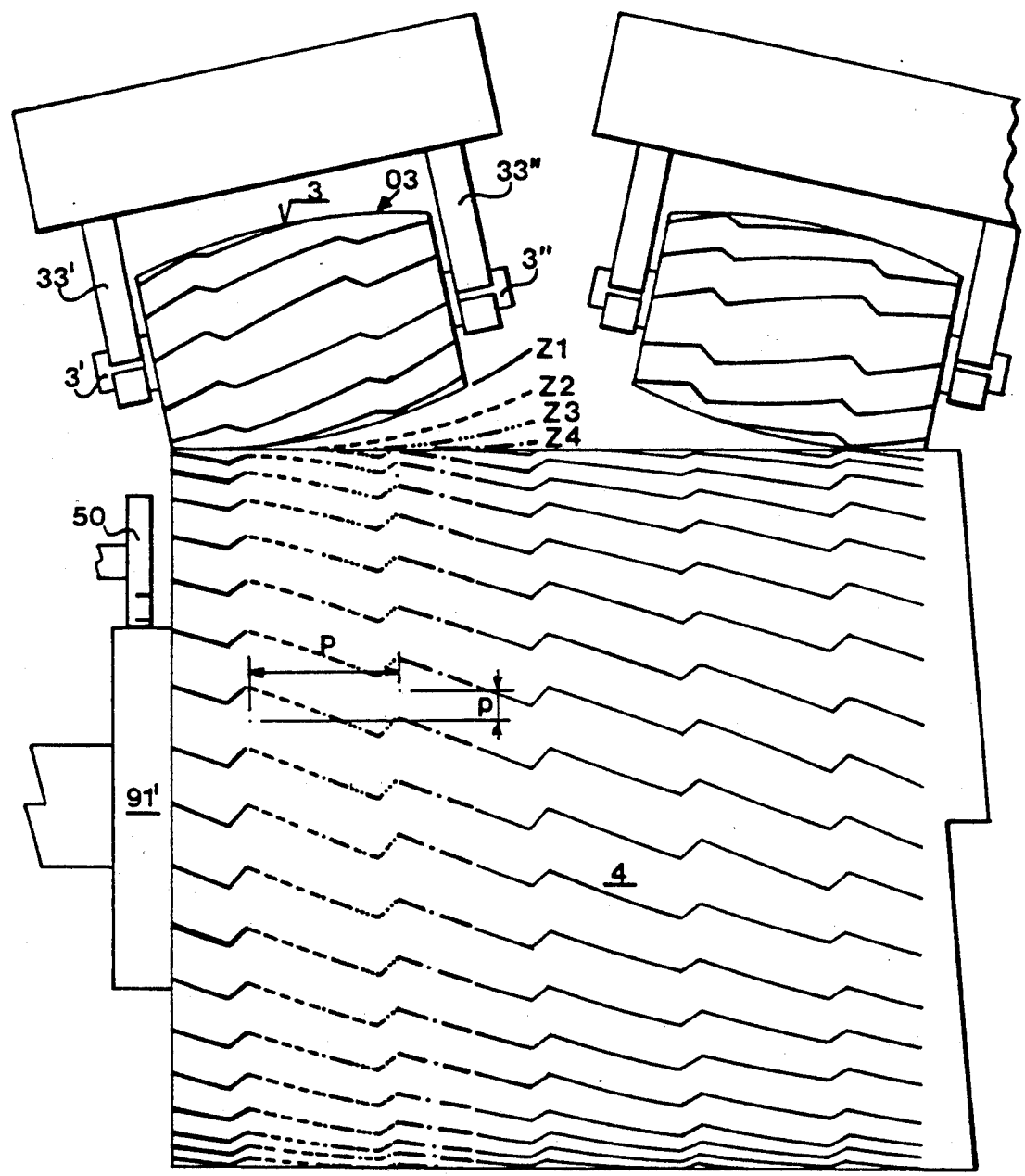
FIG. 4 is a substantially symbolic, front view of caricatured positions. The knurling tool is shown with an exaggerated barrel-like shape with regard to a roll being engraved. On the left side of FIG. 4 are lines broken in differentiated fashion. The projection of the three successive positions and their effects are provided by the knurling tool, simply rolling, in tangency contact, on the roll. On the right side of FIG. 4 the knurling tool is shown already fed by more angular and longitudinal pitches, and is in the final rolling step.

The third movement, includes the substitution of a conventional asynchronous three-phase motor, not shown, with a permanent magnet d.c. motor 5 which indirectly drives a roll gripping chuck 91. The driving of the roll is provided through a belt transmission 50" and some gears, not shown. An encoder 50, associated with this movement, monitors the real movements of roll 4 that is to be worked. The roll 4 is engaged by cylindrical surface 91', of gripping chuck 91. The gripping chuck 91 includes a dog-like driver 91", substantially without clearance, both with respect to the hub 4''', of roll 4, to be worked and thus of the same roll, and with regard to gripping chuck 91. This third movement is very important, not only in itself, but since it determines the rotation of knurling tool 3. The rotation of the knurling tool is provided with hubs 3', 3" idly mounted on respective supports 33', 33", in a conventional manner. Such movement is induced, in fact it is provided by the engagement of the knurling tool 3, which may be defined as toothed with the roll 4. As soon as a complementary relief is formed on the roll 4, a proper meshing is established, which obviates the provision of a reference mark on driver and transmission member, upstream of encoder 50, engaged by gripping chuck 91 and on the disc itself. In order to re-establish this meshing, between knurling tool 3 and roll 4, after each, longitudinal movement of knurling tool 3, two cases can arise. The first case is when the two members 3 and 4, providing the coupling, have to reencounter in the same reciprocal angular position as when embossing a design having linear repetitivity. The second case is that the reencounter happens to be on reciprocal different angular positions, dictated by longitudinal pitch P and by angular pitch p of a design with worm or angular repetitivity (FIG. 4). In the first case, a substantial absence of movement of roll 4 to be worked, corresponds to absolute immobility of knurling tool 3.

According to a preferred embodiment of the present invention, the hubs 3', 3" of knurling tool 3, are longer than conventional ones. The hubs 3', 3" extend outward from supports 33', 33", in order to be engaged by a pair of brake shoes 34, 34'. The brake shoes 34, 34' are driven by fluidynamic motors 35, controlled by electrovalves 22, 23 and fed by the same hydraulic station 21, providing the pressure for the second movement. In the second case, the absolute immobility of knurling tool 3, obtained in the same manner, is made so that a movement of the roll corresponding with an angular movement p, controlled by the encoder 50 can be made. During engaging and disengaging of the knurling tool 3 with the roll 4 there is a small gap of idleness, of roll 4. An almost spontaneous small adjusting of the angular position of the knurling tool 3 is made, such to favor the meshing engagement and disengagement of projections while, after an arcuated stroke, the knurling tool 3 goes to and from the tangency or engagement condition.

As a result of semiautomatic operation of the system in operator's absence even for very long periods up to 120 hours and more, an automatic lubricating system 13 is needed. The automatic lubricating system 3 provides lubricant to the hubs 3' and 3", of knurling tool 3. Such lubricating system is automatic and has varied lubrication methods, i.e. by soaking, and with timed forced injections.

Referring now to the fourth movement which, conventionally, is provided by the screw 30', driving a kinematic device 31. The kinematic device 31 includes a reaction spring 30". The screw 30' was provided with a member 36, driven by a geared transmission. The geared transmission is driven by a complementary member 36' driven by a permanent magnet d.c. motor 36". Permanent magnet D.C. motor 36" has power supplied to it through wire 36'''. Encoder 37 is connected to electric panel 7 by cable 37' and is axially coupled to the screw 30'. A pair of angular limit switch 38, 38', connected to electrical panel by cables 38" and 38'''are also placed on the screw 30'. The screw pitch is such to maintain the excursion within an angle less than 360°.

From what has been described heretofore the system operation should be evident, however a rough explanation will be given also with reference to two embodiments. More particularly example I shows a roll including a design of the kind not employing all the resources of the system. Whereas example II, expressly referring to FIG. 4, thoroughly uses all the system resources. In an appendix of example II the program is roughly described which is suitably provided and that, opportunely simplified may be used to program also example I.

EXAMPLE I

Having to engrave a roll 4, for special paper embossing, sized 500 mm in diameter and 4500 mm long; the blank roll 4 was duly provided and the machine was prepared, in a substantially conventional way. Roll 4 was lathed, stablized and ground. Keying means were prepared on the roll for keying to the driving dog 91'''. Spacer rings and end bearing 492, 492', were added to adequately support the diameter of the roll 4 in the cylindrical supports 92, 92'.

Referring now to the machine arrangement, carriage 93, carrying the engraving operative unit 1, is conventionally placed at the end 4' of roll 4. On the same unit, is mounted the knurling tool 3, in a Conventional manner. However, instead of a conventional assembly in order to support the knurling tool 3 a suitable bracket, not shown, may be put on or removed. Braking shoes 34, are provided, which are temporarily released and removed, in a way to be explained later on. Again, in conventional manner, the position of knurling tool 3 is set, the mounting is checked and corrected, with a suitable adjusting screw. At this stage, according to the present invention, the hydraulic station 21, is started. The hydraulic station provides a lower pressure, at least in cylinder 20, at least to reach about 3 atmospheres. Thus roll 4, is caused to rotate and pressure is gradually increased, to reach about 10, 12 atmospheres. When the operator realizes that everything is correct, the program is started for automatic prosecution of engraving, along the whole roll 4 or along part of it. Substantially no further operator's intervention is needed except for the final unloading of the roll or possibly an intermediate stage to provide a corrosion step. The program for a determined roll 4 is programmed only once and may be used repeatedly to provide a single engraving from end to end. Having to repeat the engraving, intervention is required by the operator, to return the carriage 93, including the engraving operative unit 1, to the end 4' of roll 4, substantially in starting condition, checking and adjusting the matching between the knurling tool 3 and the already engraved track, as well as with program repetition.

EXAMPLE II

Having to engrave a roll 4, for paper-cloth embossing, sized 450 mm in diameter and 2700 mm long, the blank was duly provided, as described in example 1. Reference is now made to the drawing to be engraved. In accordance with example I, the repetition of the drawing was to be made in a mere linear fashion. Only one placing of carriage 93 is needed for a mere linear repetition that involves the use of only two axes X and Y. Whereas, in the drawing of this example II, the knurling tool 3 has a length, dictated by drawing pitch. Control of the Z axis is necessary for using the knurling tool 3 along the whole length. Moreover, the nature of the drawing dictates that, against each longitudinal placing of knurling tool, an angular excursion on the Y axis is provided. The machine arrangement, repeats that of example I, up to the state wherein roll 4 is caused to rotate and pressure is gradually increased, to reach about 10, 12 atmospheres. It is to be realized that the operator verifies through manual excursion of the whole Z axis field from position 1 to position 4 of FIG. 4, that everything is correct. However, before starting the program for automatic prosecution of engraving, in contrast with example I, the knurling tool 3 is placed in position 1 of FIG. 4. Thus, as in example I, the program which obviously is different therefrom, for execution and repetition of cycle is started. The program will be such to control the X, Y, Z axes, wherein control of Y axis involves the additional function of roll repositioning. Roll repositioning requires an angular excursion corresponding with drawing, along the whole length of roll 4 or on one part thereof. No further intervention is required by the operator, exception made for the final unloading of roll or possibly an intermediate stage to provide a corrosion step. As in example I, the program, for a determined roll 4, is programmed only once and may be repeatedly used to provide a single engraving from end to end. Repeating the engraving requires an intervention of the operator to return the carriage 93 with the engraving operative unit 1 to the end 4' of roll 4 (substantially, the starting condition). Other steps include checking and adjusting the matching between the knurling tool 3 and the already engraved track, as well as with program repetition.

Figure 2:
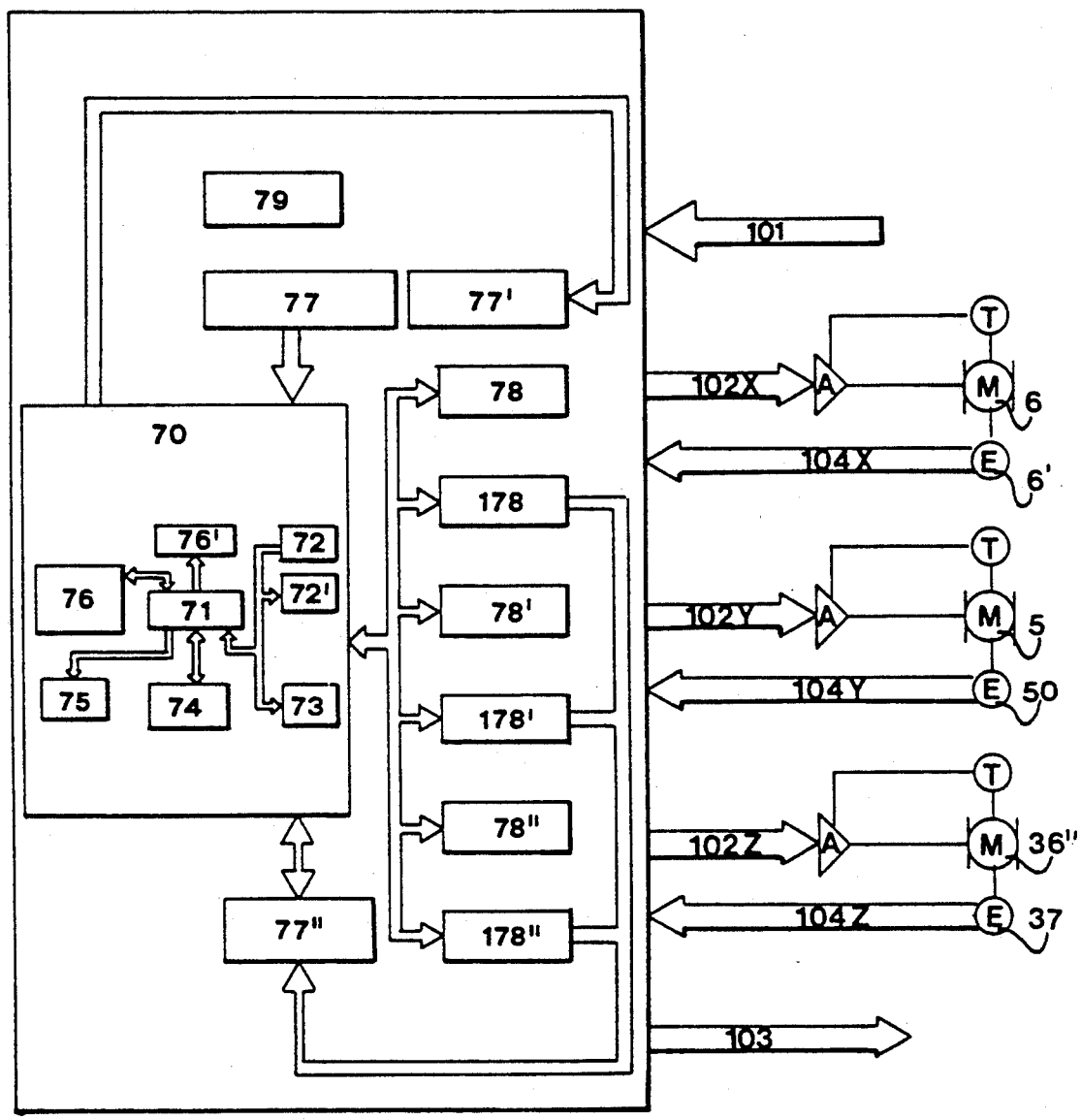
FIG. 2 is a flow chart, of the electric and electronic panel.
Figure 3:
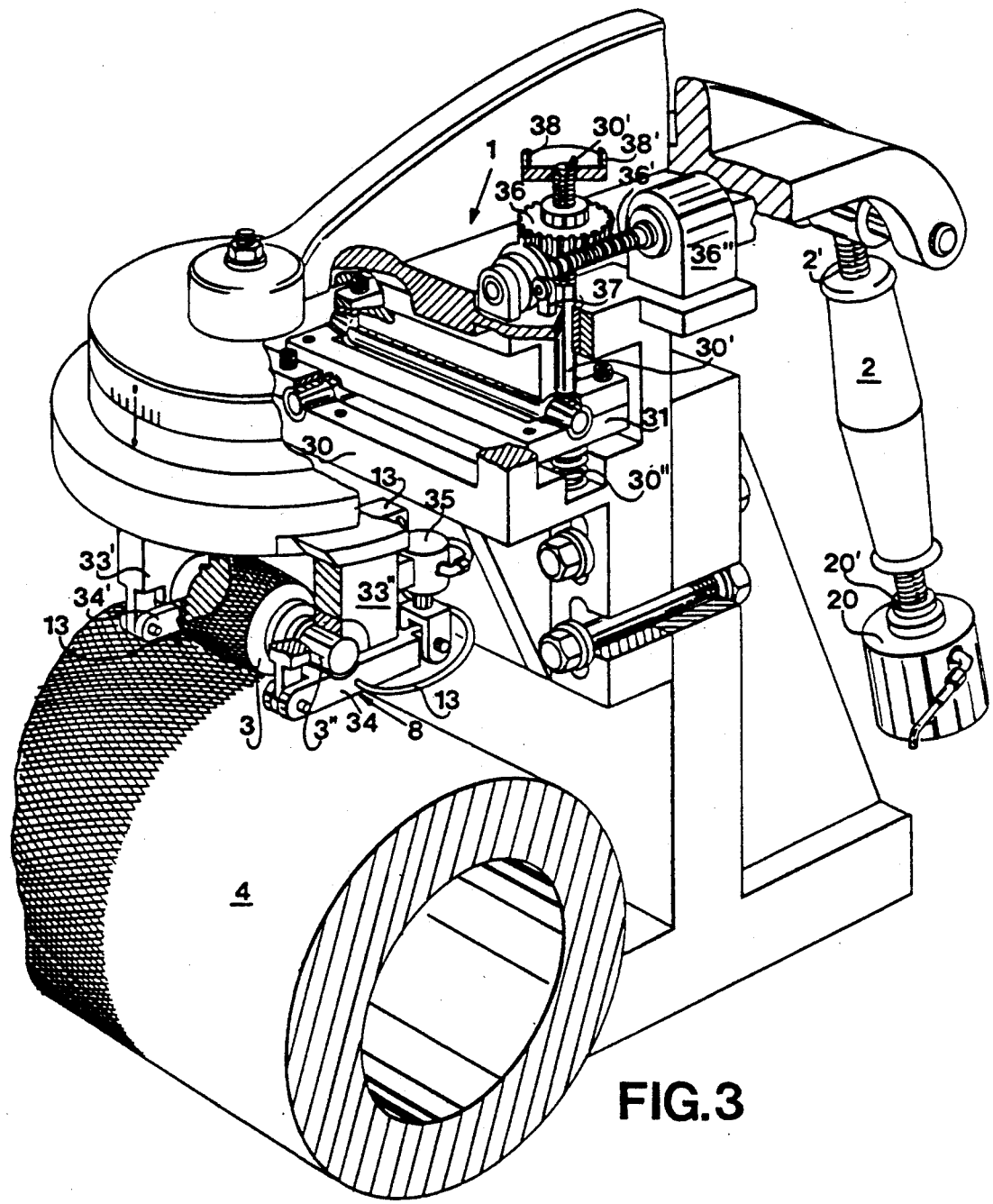
FIG. 3 is a detailed perspective view, of the most important parts of the operating machine, in the attitude wherein a roll is being engraved. A number of same parts are sectioned or broken to show other parts concealed thereby.

For automatic running of embossing programs, a numerical control is used. FIG. 2 shows a numerical control substantially comprising a central unit 70, including a microprocessor 71, EPROM memories 72, RAM memories 72', mathematic co-processor 73, serial interface 74, an analogic output 75, an input/output port 76, and a digital output 76'. The central unit 70 is connected with nine modules: an input control module 77, an output control module 77', a console module 77", an X positioning module 78, an X-counting module 178, a Y positioning module 78', a Y-counting module 178', a Z positioning module 78", a Z counting module 178", as well as power supply 79. The numerical control includes, in 101 the machine input, in 102x, 102y, 112z the on/off and reference, in 103 the miscellaneous output and in 104x, 104y, 104z the input for positional transducer encoder type. Between the on/off 102x, 102y, 102z and respective input 104x, 104y, 104z, for position transducers 6', 50, 37, are connected: motor 6, 5, 36", driver, not shown, tachometer, and encoder 6', 50 and 37. Between the on/off 102x, 102y, 102z and respective input 104x, 104y 104z for positional transducer 6', 50, 37, motors 6, 5, 36" driver, tachometer, and encoders 6', 50 and 37, are provided.

In accordance with a preferred embodiment of the present invention, microprocessor 71 is of Z 80 or 6502 or cdp 1802 type, the EPROM memories 72 are of the 27512 type or of the 27256 type. Also according to the present invention the RAM memories 72' are static, of 6264 type, with back battery, the mathematics co-processor 73, is of AMD 9511 type, and serial interface 74 is of RS232 C type.

Numerical control has substantially the following characteristics. It controls three axes, displacement range is +/− 9999,99 mm, accelerations are programmable, circular interpolation on plane, linear interpolation on all axes, programming support with parametric instructions, reference point machine cycle. Programming is absolute and/or incremental and with host computer, DNC mode and teach. Programmable functions are as follows: miscellaneous functions (M), preparatory functions (G), feed function (F) for axes, spindle function (S), nesting subroutine, nesting loop functions and reference point translation thereof; complete security diagnostic continuous checking; auto-test with variable polling; machine transducer with continuous diagnostic; manually operable in two ways with continuous and adjustable of all the axes and by programmable single steps. The interface includes 32 testable inputs, 32 24V, 100 mA, outputs +24V, 1,2A, output; output stages are of open collector type with TR BD677 type or MJ 3001 type; working is tested by external gauges (reading in BCD code). Referring now to memories: memory (72) is of 64 Kbyte, expandable up to 256 Kbyte and RAM memory (72') is of 18 Kbyte expandable up to 50 Kbyte.

Figure 5:
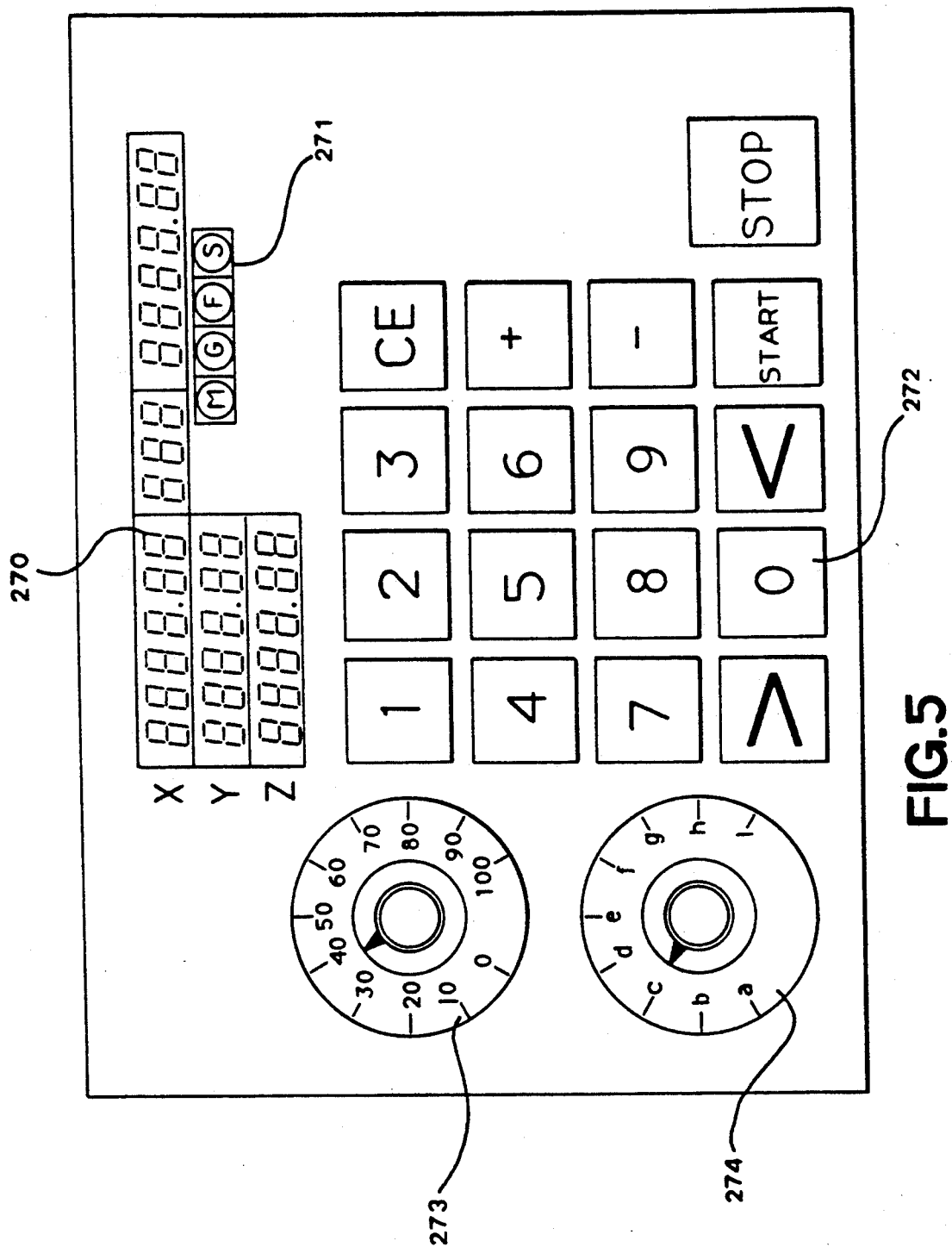
FIG. 5 is a front view of the control console.

The control console in FIG. 5 comprises: a 270 LED display, to display the digits of x, y, z axes; of program block numbers, of the instructions given; display (271) by shifting; Keyboard (272) with keys 0 to 9, keys + and − as well as keys for switching the function $elector, as well as the delete key and keys start and stop; feed rate override (273) from 10% to 100%; mode selector (274) of the operation modes with the following positions:

a) manual;
b) loading working program;
c) checking or correction of working program;
d) position auto-teaching;
e) parameter loading;
f) automatic;
g) semautomatic; (single block)
h) absolute JOG;
i) incremental JOG;

Programs drafted taking into account these particulars.

APPENDIX

The program for engraving of roll 4, with the drawing of example II shown in FIG. 4 is the following:
1)M24; 2)@t1; 3)M21; 4)@t2; 5)M23; 6)G91; 7)Zz1-z4; 8)@t3; 9)M83; 10)@t4; 11)M22; 12)@t5; 13)M82; 14)@t6; 15)M81; 16)M84; 17)G91; 18)Zz4-z1; 19)G91; 20)XP; 21)G62; 22)M25; 23)Yp; 24)M85; 25)@t7; 26)JnP-1; 27)M99.

In such program M is a function and precisely: 21=unbraking of knurling tool 3; 22=back rotation of roll 4; 23=forward rotation of roll 4; 24=approaching of knurling tool 3 to roll 4; 25=p angular back rotation;

81=braking of knurling tool 3; 82=stopping of roll 4; 83=stopping of roll 4; 84=detaching of knurling tool 3; 85=stopping of roll; 99=end of the cycle. @ indicates the waiting time, of tn duration, wherein n is from 1 to 7. X indicates the movement of carriage 93 by a distance P. Y indicates the angular excursion of roll 4 by p angle. Z indicates the extent of angular excursion that knurling tool 3 has to make in the time t3+t4+t5. G indicates the axes commutation and a displacement of p, P, z1-z4, z4-z1 extent, and precisely: 62=on Y axis; 91, respectively, on X axis and on Z axis. J indicates the number of return to the program origin 1) before passing to instructions M99.

I claim:

1. A process for automatically matching at least two substantially cylindrical surfaces, for engaging each other, for mechanical embossed engraving of a roll with an engraving tool, using ranges of freedom of a knurling tool, said process comprising starting, repetitive and final steps, including:

mechanizing and subjecting said ranges of freedom to electronic control, by providing a hardware structure, available to materialize a software which, each time, can understand the design being engraved, and controlling the starting, repetitive and final steps, complying with spaces and times, in an automatic mode, said step of controlling including the step of braking of said knurling tool between each repetitive step to maintain a pattern in said knurling tool aligned with a pattern engraved on said roll.

2. The process as claimed in claim 1, further comprising the steps of:

providing a roll to be worked;

displacing said knurling tool, said knurling tool having four ranges of freedom by means of a press to radially engage said roll;

rotating said roll with a d.c. motor, said d.c. motor being controlled by an encoder.

3. The process as claimed in claim 2, further comprising the steps of:

controlling said four ranges of freedom and said braking to inhibit the rotation of said knurling tool when disengaged from said roll.

4. The process as claimed in claim 3, wherein said step of controlling said four ranges of freedom includes a step of controlling a first range of freedom, said step of controlling a first range of freedom comprising the steps of:

longitudinally displacing a carriage, on which said knurling tool is installed said carriage being driven by a screw independently rotated by a D.C. motor; and controlling the location of said carriage with respect to the roll in response to signals generated by an encoder attached to said screw, and limit switches installed at the ends of the roll to be worked limit the displacement of said carriage by said D.C. motor.

5. The process as claimed in claim 3, wherein said step of controlling said four ranges includes the step of controlling a second range of freedom, said step of controlling a second range of freedom comprises the steps of:

approaching and removing of said knurling tool from said roll to be worked, in a substantially radial, substantially vertical direction wherein said second range of freedom includes a manually adjustment screw for determining a base place, to be determined once said process includes the step of manually adjusting said manual adjustment screw to determine said base place for an angular excursion provided by a first class lever suspension, wherein said angular excursion is provided by a pneumatic or hydraulic cylinder-piston unit by an electrovalve controlled by signals coming from a computerized electronic system, said second range of freedom being limited by a limit switch.

6. The process as claimed in claim 5 wherein said step of controlling a second range of freedom comprises providing said hydraulic cylinder piston with two different intensities; one of said two different intensities being lower at the beginning and upon a certain time set on a timer, the second of said two different intensities being a full pressure.

7. The process as claimed in claim 3, wherein said step of controlling said four ranges of freedom further comprises the step of controlling a third range of freedom, said step of controlling said third range of freedom comprises the steps of:

inducing said knurling tool to rotate around its axis, by engaging said knurling tool with said roll to be worked and braking temporarily said knurling tool, in the time interval between said removing and approaching of said knurling tool to said roll, in accordance with said second range of freedom, associated with each longitudinal displacement of said carriage, in accordance with said first freedom range.

8. The process as claimed in claim 3, wherein said step of controlling four ranges of freedom includes controlling a third range of freedom, said step of controlling a third degree of freedom comprises the step of controlling a permanent magnet d.c. motor for indirectly driving a roll gripping chuck, such indirect driving being provided through a belt transmission and at least two gears, an encoder associated to the movement of the roll gripping chuck, monitors the real movements of said roll to be worked, said encoder being engaged by cylindrical surface, of a leading disc of said roll gripping chuck, said roll gripping chuck, including a driving dog substantially without clearance, both with respect to hub, of said roll, to be worked and thus with respect to said leading disc.

9. The process as claimed in claim 3, wherein said step of controlling includes a step of controlling a fourth range of freedom, said step of controlling a fourth range of freedom comprises the step of re-engaging said knurling tool with said roll at different angular reciprocal positions.

10. The process as claimed in claim 3, wherein said fourth range of freedom is provided by a screw, driving a kinematic device, comprising a reaction spring, characterized in that said fourth range of freeedom is mechanized, providing said screw with a member driven by a complementary member, driven by a permanent magnet d.c. motor, and wherein an encoder, is axially coupled to said screw, and a pair of angular limit switches limit the rotation of said screw, wherein said limit switches maintain the excursion of said screw within an angle less than 360°.

11. A machine for automatically matching at least two substantially cylindrical surfaces for engaging each other, for mechanical emboss engraving of a roll, said machine comprising:

a structure supporting said roll for rotation thereon about an axis of rotation;

means for rotating said roll about said axis of rotation;

a carriage movably mounted to said structure, said carriage being movable in a direction parallel to said axis of rotation of said roll;

a knurling tool rotatably mounted to a pair of supports, said pair of supports movably mounted to said carriage, said knurling tool rotatable in response to the rotation of said roll when said knurling tool is in engagement with said roll;

means for pivotally moving said knurling tool into engagement and out of engagement with said roll;

means for axially displacing said carriage a predetermined distance;

a brake mounted to at least one of said pair of support members selectively operable to engage said knurling tool and inhibit the rotation thereof; and means for electronically controlling the operation of said machine including controlling said means for pivotally moving said knurling tool, said means for axially displacing said carriage, and said brake, said means for electronically controlling sequentially controlling the operation of said machine through repeatable sequences progressively along said roll.

12. A process for use on a machine tool for automatically matching a knurling tool mounted on a carriage, to a roll for mechanical embossment of said roll with a pattern comprising the steps of:

approaching and engaging said roll with said knurling tool having a predetermined pattern for a first engraving engagement;

unbraking said knurling tool to permit free rotation;

activating a motor to rotate said roll in a forward direction of rotation so that said knurling tool knurls said predetermined pattern on said roll;

stopping said roll after a predetermined angular revolution of said roll;

braking said knurling tool to prevent the rotation thereof;

pivoting said knurling tool away from said roll;

displacing said carriage supporting said knurling tool linearly a predetermined distance with respect to said first engraving engagement of said knurling tool;

rotationally indexing said roll to match the pattern on said knurling tool with the pattern engraved on said roll; and repeating said steps of approaching, unbraking, activating a motor stopping said roll, braking, detaching said knurling tool, displacing said carriage supporting said knurling tool and indexing a predetermined number of times until a desired portion of the roll is engraved.

* * * * *